United States Patent [19]

Bottau et al.

[11] Patent Number: 4,933,957

[45] Date of Patent: Jun. 12, 1990

[54] LOW BIT RATE VOICE CODING METHOD AND SYSTEM

[75] Inventors: Francoise Bottau, Nice; Claude Galand; Jean Menez, both of Cagnes sur Mer; Michele Rosso, Nice, all of France

[73] Assignee: International Business Machines Corporation, Armon, N.Y.

[21] Appl. No.: 320,192

[22] Filed: Mar. 7, 1989

[30] Foreign Application Priority Data

Mar. 8, 1988 [EP] European Pat. Off. ........ 88480006.1

[51] Int. Cl.[5] ........................ H04B 1/66; H04B 14/06

[52] U.S. Cl. ...................................... 375/27; 375/122; 381/29; 381/31

[58] Field of Search ........................... 375/27, 33, 122; 381/29, 31, 32; 341/106, 143; 370/118; 358/138

[56] References Cited

U.S. PATENT DOCUMENTS

| | | | |
|---|---|---|---|
| 4,191,858 | 3/1980 | Araseki | 375/122 |
| 4,569,075 | 2/1986 | Nussbaumer | 381/34 |
| 4,790,015 | 12/1988 | Callens et al. | 381/31 |
| 4,821,324 | 4/1989 | Ozawa et al. | 381/31 |

*Primary Examiner*—Benedict V. Safourek

*Attorney, Agent, or Firm*—Edward H. Duffield

[57] ABSTRACT

This low bit rate voice encoding involves short-term predictive filtering the voice signal s(n) using partial correlation related coefficients derived from pre-emphasized s(n), and deriving a short term signal r(n); then deriving a long-term residual signal e(n) by subtracting a delayed synthesized short term b.r'(n-31 M) from said r(n); and code excited encoding e(n) into codeword references k's and associated gains G's.

6 Claims, 7 Drawing Sheets

LOW BIT RATE VOICE CODING METHOD AND SYSTEM

FIELD OF INVENTION

This invention deals with digital encoding of voice signal and is particularly oriented toward low bit rate coding.

BACKGROUND OF INVENTION

A number of methods are known for digitally encoding voice signal, that is, for sampling the signal and converting the flow of samples into a flow of bits, representing a binary encoding of the samples. This supposes that means are available for reconverting back the coded signal into its original analog form prior to providing it to its destination. Both coding and decoding operations generate distortions or noise to be minimized for optimizing the coding process.

Obviously, the highest the number of bits assigned to coding the signal, i.e. the bit rate, is, the better the coding would be. Unfortunately, due to cost efficiency requirements, like for instance cost of transmission channels, one needs concentrating several user sources of voice signals on a same transmission channel through multiplexing operations. Therefore, the lower the bit rate assigned to each voice coding, the better the system is. Consequently, one needs optimizing the coding quality and efficiency at any desired bit rate. A lot of efforts have been devoted to developing coding methods enabling optimizing the coding/decoding quality, or in other words, enabling minimizing the coding noise at a given rate.

A method was presented by M. Schroeder and B. Atal at the ICASSP 1985 with title "Code-Excited Linear Prediction (CELP); High-quality speech at very low bit rates" Basically, said method includes pre-storing several sets of coded data (codewords) into a code-book at known referenced locations within the book. The flow of samples of the voice signal to be encoded is then split into blocks of consecutive samples and then each block is represented by the reference of the code-word which matches best to it. A main drawback of this method is due to it involving a high computational complexing.

The method was further improved in "Fast CELP coding based on algebraic codes" presented by J. P Adoul et. al at ICASSP 1987, to enable lowering the "huge amount of computations involved". However, said computations still involve inverse filtering, i.e. rather highly computing power consumer, over each of the code-book codewords tested, for each block of signal samples to be encoded.

SUMMARY OF THE INVENTION

One object of this invention is to provide a voice coding system based on code-excited prediction considerations wherein minimal filtering is to be operated over the codewords.

Another object of this invention is to provide a voice coding system wherein code excited coding is operated over a band limited portion of the voice signal.

Still another object is to provide an improved code-book conception minimizing the code-book size.

The original speech signal or at least a band limited portion of it, is processed to derive therefrom a (deemphasized) short term residual signal, which signal is then processed to derive a long term residual signal through analysis by synthesis operations performed over CELP encoding of the long term residual and synthesis of a long term selected codeword.

The foregoing and other objects, features and advantages of the invention will be made apparent from the following more particular description of a preferred embodiment of the invention as illustrated in the accompanying drawings.

DETAILED DESCRIPTION OF PREFERRED EMBODIMENT

Figure 1:
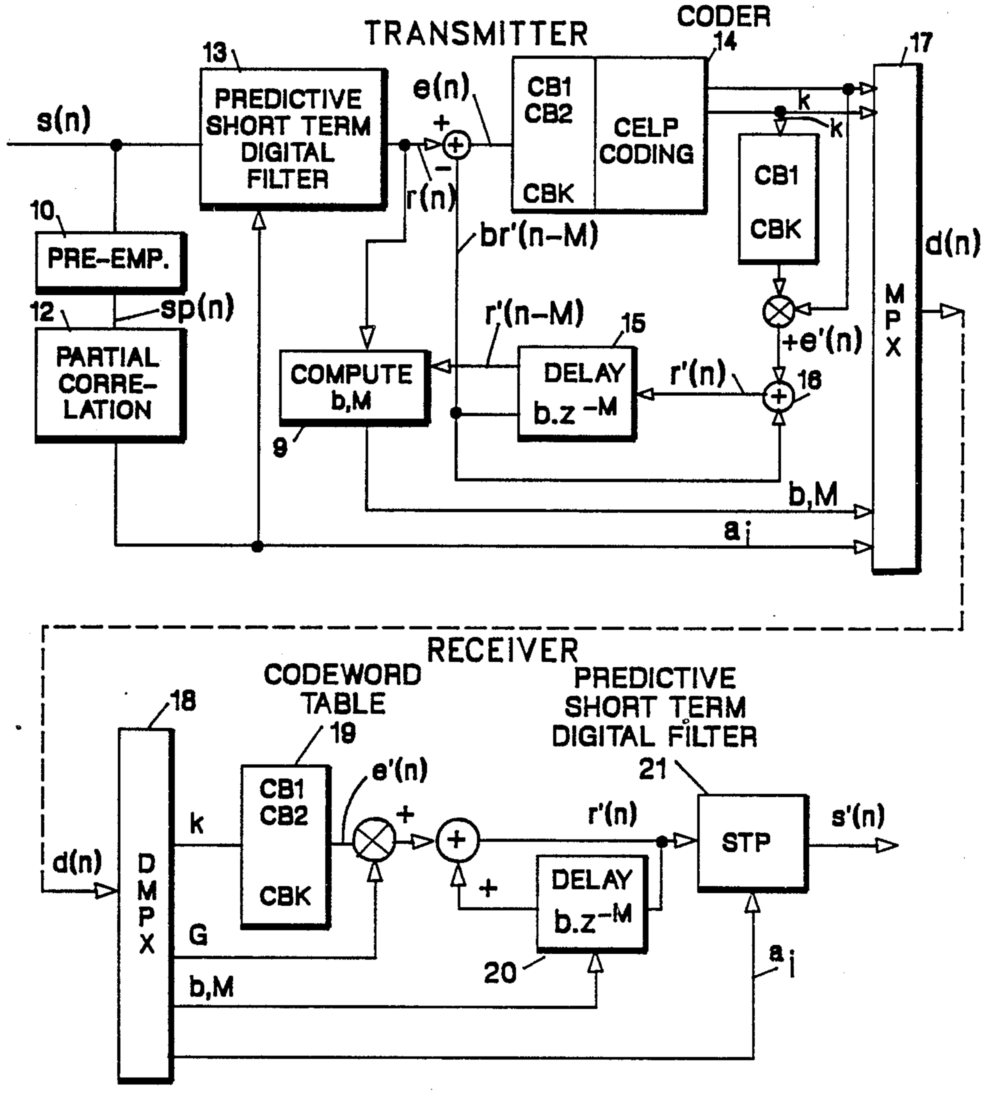
FIG. 1 is a block diagram of the basic elements of both transmitter and receiver made according to the invention.

FIG. 1 is a block diagram of the basic elements used in the transceiver (transmitter/receiver including the coder/decoder) implementing the invention.

The voice signal to be transmitted, sampled at 8 Khz and digitally PCM encoded with 12 bits per sample in a conventional analog to Digital converter (not shown), provides samples s(n). These samples are first pre-emphasized in a device (10) and then processed in a device (12) to derive sets of partial auto-correlation derived coefficients (PARCOR derived) $a_i$ used to tune a short term predictive (STP) filter (13), filtering s(n) and providing a first residual signal r(n), i.e a short-term residual signal. Said short-term residual signal is then processed to derive therefrom a second or long-term residual signal e(n) by subtracting from r(n), a synthesized signal r'(n) delayed by a predetermined long-term delay M and multiplied by a gain factor b. Said b and M values are computed in a device (9).

It should be noted that for the purpose of this invention block coding techniques are used over r(n) blocks of samples, 160 samples long. Parameters b and M are evaluated every 80 samples. The flow of residual signal samples e(n) is thus subdivided into blocks of predetermined length L consecutive samples and each of said blocks is then processed into a Code-Excited Linear Predictive (CELP) coder (14) wherein K sequences of L samples are made available as normalized codewords. Recoding e(n) at a lower rate involves then selecting the codeword best matching the considered e(n) sequence and replacing said e(n) sequence by a codeword reference numbers k's. Assuming the prestored codewords be normalized, then, gains coefficient G's should also be determined and tested. For each sequence of 160 samples, one will thus get N=160/L pairs (k,G) and two pairs (b,M)

Once k is determined, the selected $k^{th}$ codeword CBk subsequently multiplied by the gain coefficient G, representing a synthesized long-term residual signal e'(n) is fed into a long-term prediction loop (15) through an adder (16), the second input of which is fed with the output of device (15) or in other words with the delayed and weighted synthesized short-term residual. The adder (16) therefore provides a synthesized short-term residual signal r'(n).

Finally, the original signal has been converted into a lower bit rate flow of data including: G, k, b, M data e.g. N coupes of (G, k) and two couples of (b, M), and a set of PARCOR coefficients $K_i$, or of PARCOR related coefficients $a_i$ per block of 160 s(n) samples, all multiplexed by a multiplexer MPX (17) and transmitted toward the receiver/decoder.

Decoding involves first demultiplexing in DMPX (18) the data frames received to separate G's, k's, b's, M's and $a_i$'s from each other. For each block, the k value is used to select a codeword CBk from a prerecorded table (19), subsequently multiplying CBk by the corresponding gain coefficient G, to recover a L-samples block synthesized e'(n). Inverse long-term prediction is then operated over each e'(n), to recover a synthesized short-term residual r'(n) using a device (20) including a delay element adjusted to the delay M and b gain, and an adder. Finally, r'(n) is fed into an inverse short-term digital filter (21) tuned with the coefficient $a_i$ and providing a synthesized voice signal s'(n).

Figure 2:
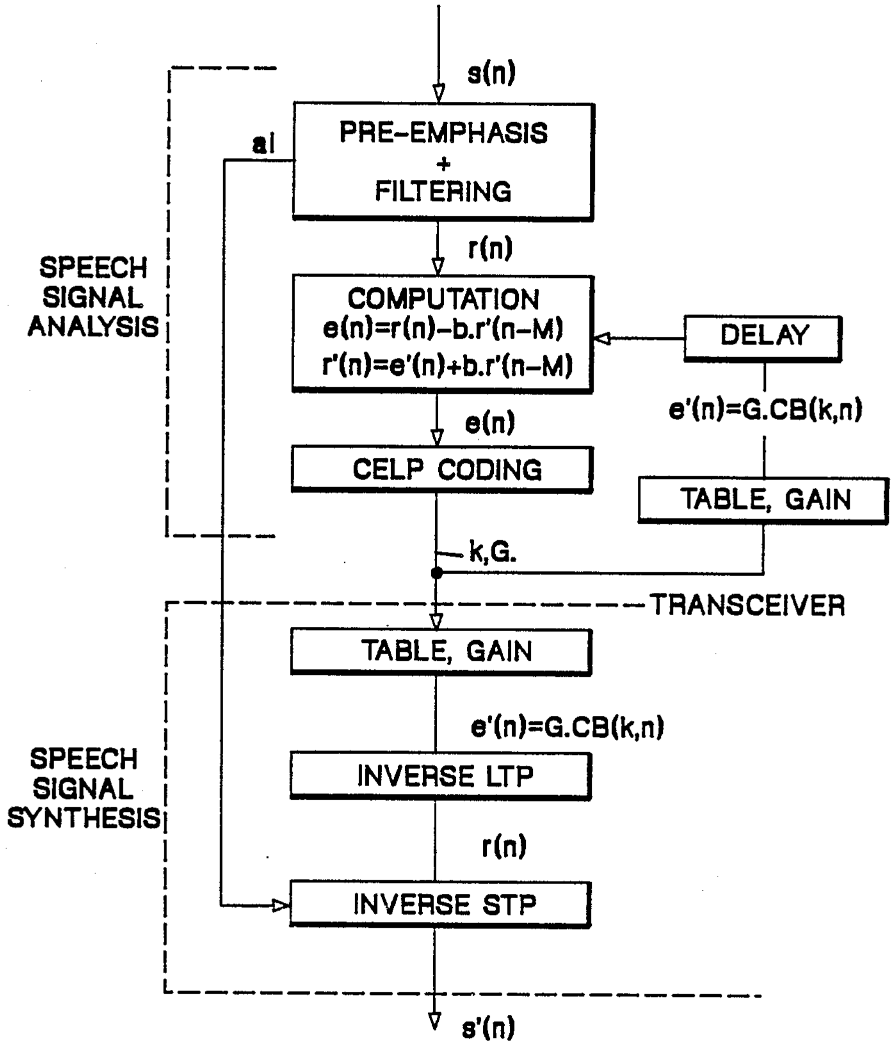
FIGS. 2 and 3 are flow charts of the operations performed by the ,device of FIG. 1.

The flow chart of FIG. 2 summarizes the sequences of operations of the device of FIG. 1. A preemphasized short-term analysis performed over s(n) with a digital filter (13) having a transfer function in the z domain represented by A(z), provides r(n). Long-term analysis is then operated over r(n), residual signal e(n) as well as synthesized representations of same, to provide:

$$e(n)=r(n)-b\cdot r'(n-M)$$

$$r'(n)=e'(n)+b\cdot r'(n-M)$$

e(n) is CELP encoded into codeword reference number k and gain factor G.

On the receiver side, the signal synthesis involves: selecting a codeword and amplifying it to get a synthesized $$e'(n)=G\cdot CB(k,n).$$

Then, synthesizing s'(n) through two inverse filtering operations, one designated by 1/B(z) for the long-term synthesis (LTP) operation and the other designated by 1/A(z) for the short-term operation.

Figure 3:
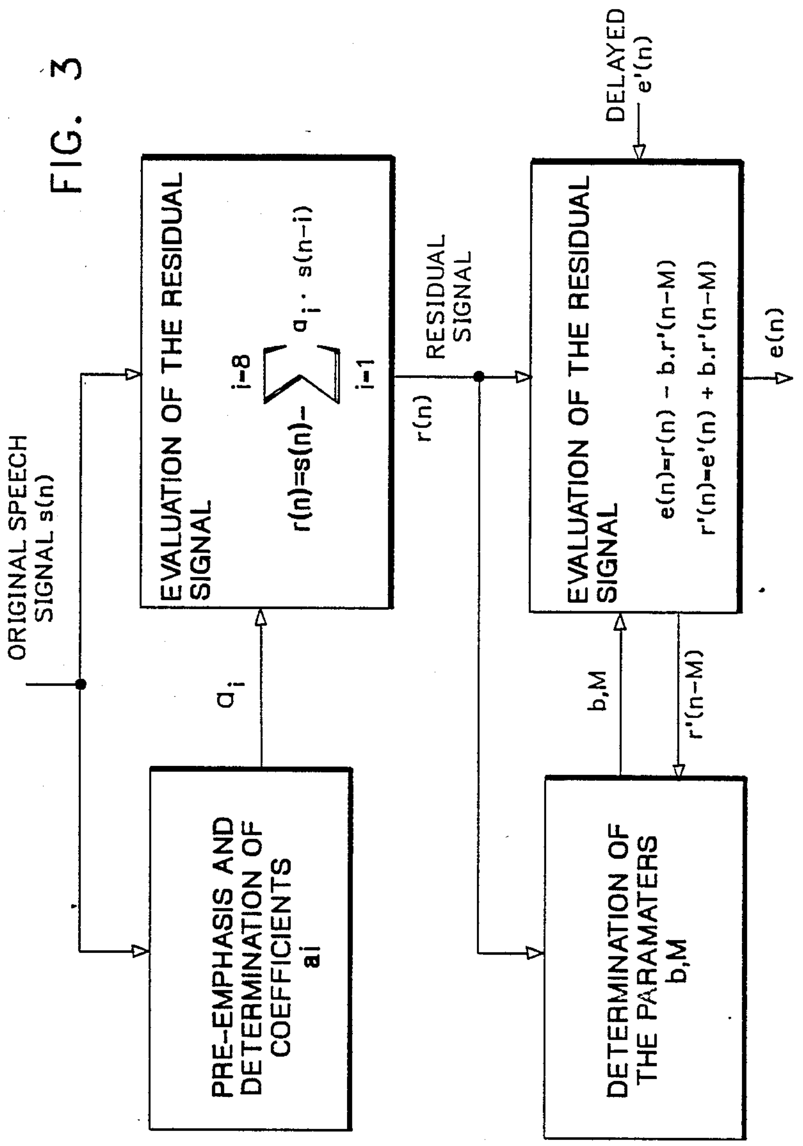

In FIG. 3 is a more detailed representation of the operations involved in the two upper boxes of FIG. 2:

First, pre-emphasis enable getting pre-emphasized PARCOR derived coefficients $a_i$. Said pre-emphasized $a_i$'s are then used to set (tune) the short-term digital filter and derive:

$$r(n) = s(n) - \sum_{i=1}^{i=8} a_i \cdot s(n-i)$$

The symbol Σ referring to a summing operation, and assuming the set of PARCOR is made to include eight coefficients and the filter is an eight recursive taps digital filter. Said filtering technique is well known to a man skilled in the digital signal processing art. It could either be hardware implemented using a multi input adder, an eight taps shift register and tap inverters or be implemented using a microprogram driven processor.

The residual signal r(n) is used to determine the long term parameters b and M evaluated every 80 samples. These parameters are then used to set a long term filter (15) device (see FIG. 1) and computing:

$$e(n)=r(n)-b\cdot r'(n-M)$$

$$r'(n)=e'(n)+b\cdot r'(n-M)$$

Several methods are available for computing b and M values. One may for instance refer to B. S. Atal "Predictive Coding of Speech at low Bit Rate" published in IEEE trans on Communication, Vol. COM-30, April 1982; or to B. S. Atal and M. R. Schroeder, "Adaptive predictive coding of speech signals" Bell System Technical Journal, Vol 49, 1970.

Generally speaking, M is a pitch value or an harmonic of it and methods for computing it are known to a man skilled in the art.

A very efficient method was also described in a copending European application No. 87430006.4 to the same assignee.

According to said application:

$$b = \frac{\sum_{n=1}^{80} r(n) \cdot r'(n-M)}{\sum_{n=1}^{80} [r'(n-M)]^2}$$

With b and M being determined twice over each block of 160 samples, using 80 samples and their 80 predecessors The M value, i.e. a pitch related value, is therein computed based on a two-steps process. A first step enabling a rough determination of a coarse pitch related M value, followed by a second (fine) M adjustment using auto-correlation methods over a limited number of values.

1. First step:

Rough determination is based on use of non linear techniques involving variable threshold and zero crossing detections more particularly this first step includes:

initializing the variable M by forcing it to zero or a predefined value L, or to previous fine M;

loading a block vector of 160 samples including 80 samples of current sub-block, and the 80 previous samples;

detecting the positive (Vmax) and negative (Vmin) peaks within said 160 samples;

computing thresholds: positive threshold Th+=alpha. Vmax negative threshold Th−=alpha. Vmin alpha being an empirically selected value (e.g. alpha =0.5)

Setting a new vector X(n) representing the current sub-block according to:

X(n)=1 if r(n) Th+

X(n)=−1 if r(n) Th−

X(n)=0 otherwise.

This new vector containing only −1, 0 or 1 values will be designated as "cleaned vector";

detecting significant zero crossings (i.e. sign transitions) between two values of the cleaned vector, i.e. zero crossing close to each other;

computing M' values representing the number of r(n) sample intervals between consecutive detected zero crossings;

comparing M' to the previous rough M by computing $\Delta M=|M'-M|$ and dropping any M' value whose ΔM is larger than a predetermined value D (e.g. D=5);

2. Second step:

Fine M determination is based on the use of autocorrelation methods operated only over samples taken around the samples located in the neighborhood of the pitched pulses.

Second step includes:

Initializing the M value either as being equal to the rough (coarse) M value just computed assuming it is different from zero, otherwise taking M equal to the previous measured fine M;

locating the autocorrelation zone of the cleaned vector, i.e. a predetermined number of samples about the rough pitch;

computing a set of R(k') values derived from:

$$R(k') = \sum_{n=1}^{80} r(n) \cdot r'(n-k')$$

with k' being the cleaned vector sample index varying from a lower limit Mmin to the upper limit Mmax of the selected autocorrelation zone with limits of the autocorrelation zone Mmin−L, Mmax=120 for example.

locating the maximum R(k'), i.e. the autocorrelation peak, as defining the fine M value looked for.

Once b and M are computed in device 9 by performing the above algorithms, M is used to adjust delay line (15) length accordingly, providing therefore r'(n−M) by delaying r'(n) output of adder 16. Then, b is used to multiply r'(n−M) and get b·r'(n−M) at the output of device (15).

Figure 4:
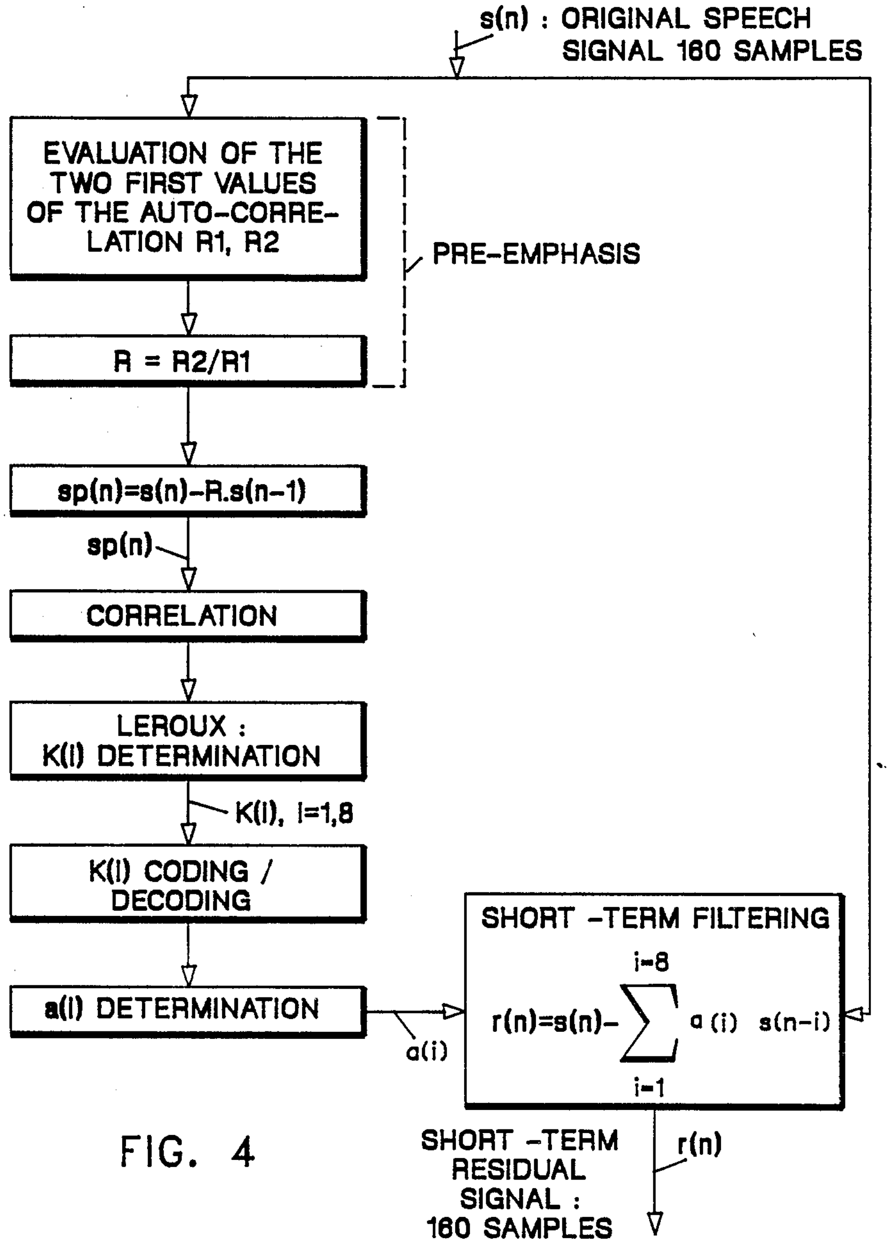
FIGS. 4 and 5 are flow charts of operations involved in the invention.

Represented in FIG. 4 is a flow chart showing the detailed operations involved in both preemphasis and PARCOR related computations. Each block of 160 signal samples s(n) is first processed to derive two first values of the signal autocorrelation function:

$$R1 = \sum_{j=1}^{160} s(j) \cdot s(j)$$

$$R2 = \sum_{j=2}^{160} s(j-1) \cdot s(j)$$

The pre-emphasis coefficient R is then computed:

$$R = R2/R1,$$

and the original set of 160 samples s(n) are converted into a pre-emphasized set sp(n)

$$sp(n) = s(n) - R \cdot s(n-1)$$

The pre-emphasized $a_i$ parameters are derived by a step-up procedure from so-called PARCOR coefficients K(i) in turn derived from the pre-emphasized signal sp(n) using a conventional Leroux-Guegen method. The $K_i$ coefficients may be coded with 28 bits using the Un/Yang algorithm. For reference to these methods and algorithm, one may refer to:

J. Leroux and C. Guegen "A fixed point computation of partial correlation coefficients" IEEE Transactions on ASSP pp 257–259, June 1977.

C. K. Un and S. C. Yang "Piecewise linear quantization of LPC reflexion coefficients" Proc. Int. Conf. on ASSP Hartford, May 1977.

J. D. Markel and A. H. Gray: "Linear prediction of speech" Springer Verlag 1976, Step-up procedure pp 94–95.

European patent No. 0 002 998 (U.S. counterpart No. 4,216,354)

The short-term filter (13) derives the short-term residual signal samples:

$$r(n) = s(n) - \sum_{i=1}^{i=8} a_i \cdot s(n-i)$$

Said r(n) sequence of samples is then divided in subsequence blocks of L and used to derive e(n) to be encoded at a lower bit rate into the codeword reference k and gain factor G(k). The codeword and gain factor selection is based on mean squared error criteria considerations, i.e. minimizing a term E wherein:

$$E = [e(n) - G(k) \cdot CB(k,n)]^T \cdot [e(n) - G(k) \cdot CB(k,n)] \quad (1)$$

with: T meaning the mathematical transposition operation. CB(k,n) is a table within the coder 14 of FIG. 1. In other words, E is a scalar product of two L-components vectors, wherein L is the number of samples of each codeword CB.

The optimal scale factor G(k) that minimizes E is determinated by setting:

$$\frac{dE}{dG} = 0$$

and $$G(k) = \frac{e(n)^T \cdot CB(k,n)}{\| CB(k,n) \|^2}$$

The denominator of equation G(k) is a normalizing factor which could be avoided by pre-normalizing the codewords within the pre-stored table.

The expression (1) can be reduced to:

$$E = \| e(n) \|^2 - \frac{[e(n)^T \cdot CB(k,n)]^2}{\| CB(k,n) \|^2} \quad (2)$$

and the optimum codeword is obtained by finding k maximizing the last term of equation (2).

Let CB2(k) represent $||CB(k,n)||^2$ and, SP (k) be the scalar product $e^T(n) \cdot CB(k,n)$, then one has first to find k providing a term $$\frac{SP(k)^2}{CB2(k)}$$

maximum, and then determine the G(k) value from:

$$G = \frac{SP(k)}{CB2(k)}$$

Figure 5:
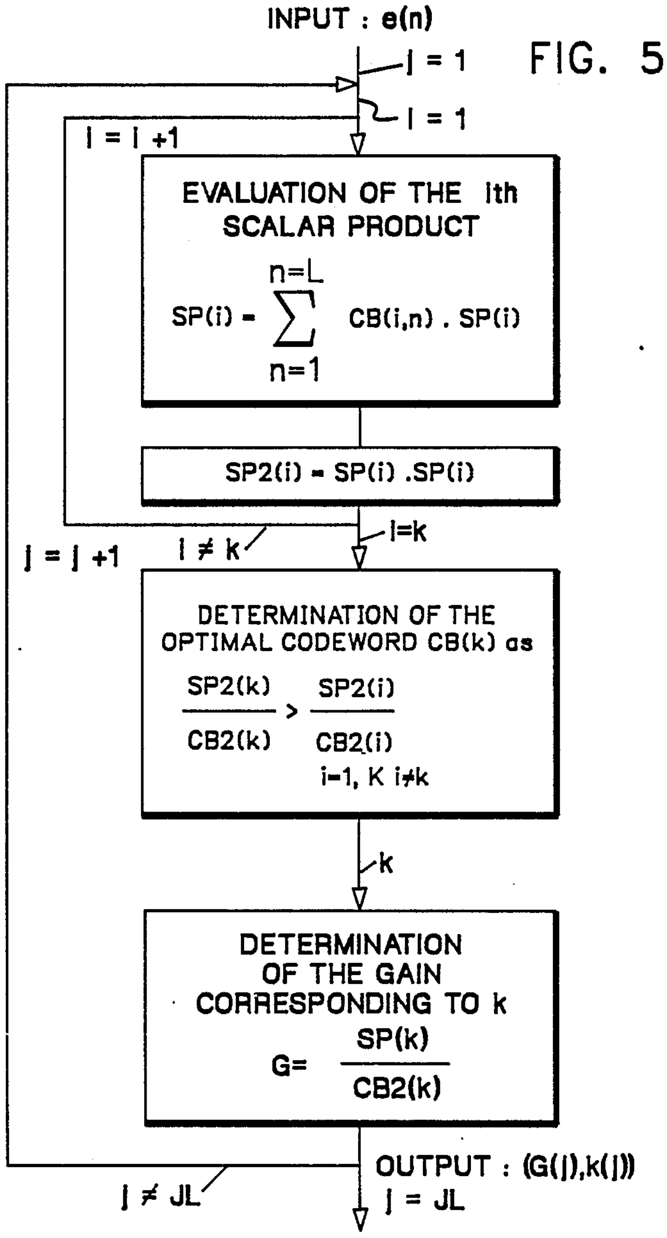

The algorithm for performing the above operations is represented in FIG. 5.

First two index counters i and j are set to i=1 and j=1. The table is sequentially scanned. A codeword CB(1,n) is read out of the table.

A first scalar product is computed $$SP(1) = \sum_{n=1}^{L} CB(1,n) \cdot e(n) \quad (3)$$

This value is squared into SP2(1) and divided by a squared value of the corresponding codeword [i.e. CB2(1)]. i is then incremented by one and the above operations are repeated until i=K, with K being the number of codewords in the code-book. The optimal codeword CB(k), which provides the maximum $$\frac{SP2(k)}{CB2(k)}$$

within the sequence $\frac{SP2(i)}{CB2(i)}$ for $i = 1, \ldots, K$ is then selected. This operation enables detecting the table reference number k.

Once k is selected, then the gain factor is computed using:

$$G = \frac{SP(k)}{CB2(k)}$$

Assuming the number of samples within the sequence e(n) is selected to be a multiple of L, then said sequence e(n) is subdivided into JL windows each L samples long, then j is incremented by 1 and the above process is repeated until j=JL.

Note that if the pitch value M is low limited by Mmin=L, then the all CE/LTP loop is applied every L samples and we have JL=1 for each of the CE/LTP application. The LTP parameters are recomputed only after 80 r(n) samples CE/LTP treatment.

Computations may be simplified and the coder complexity reduced by normalizing the code-book in order to set each codeword energy to the unit value In other words, the L component vectors amplitudes are normalized to one CB2(i)=1 for i=1, . . . , K In that case, the expression determining the best codeword k is simplified (all the denominators involved in the algorithm are equal to the unit value). The scale factor G(k) is changed whereas the reference number k for the optimal sequence is not modified.

The above statements could be differently expressed as follows:

Let (en) with n=1, 2, . . . , L represent the sequence of e(n) samples to be encoded And let $\{Y_n^k\}$ with n=1, 2, . . . , L and k31 1, 2, . . . , K represent a K by L table containing K codewords of L samples each. The CELP encoding would lead into:

computing correlation terms:

$$Ek = \sum_{n=1}^{L} en \cdot Y_n^k$$

for $k = 1, \ldots, K$ selecting the optimum value of k leading to:

$$Ekopt = \max_{k = 1, \ldots, K} (Ek)$$

with the corresponding gain G(k)=Ekopt converting the {en} sequence into a block of:

cbit=$\log_2$ K bits plus the G(k) encoding bits.

This method would require a fairly large memory to store the table. KxL may be of the order of 40 kilobits for K=256.

A different approach is recommended here Upon initialisation of the system, a first block of L+K samples of residual originated signal, e.g. e(n), would be stored into a table Y(n), (n=1, L+K). Then each subsequent L-word long sequence {en} is correlated with the (L+K) long table sequence by shifting the {en} sequence from one sample position to the next, over the following expression:

$$Ek = \sum_{n=1}^{L} en \cdot Y(n + k - 1)$$

for $k = 1, \ldots, K$

This method enables reducing the memory size required for the table, down to 2 kilobits for case of K=256.

As mentioned with reference to FIG. 1, the receiver or speech synthesis operations involve first demultiplexing the received data to separate k's, G(k)'s, b's, M's and the $a_i$ data from each other. Then k is used to select from a table the corresponding codeword CB(k,n). Then multiplying said codeword by G(k) enables synthesizing the residual signal e'(n)=G(k)·CB(k,n).

The b and M parameters are used in the receiver, which enabled tuning the delay element b·r'(n−M) and deriving the synthetic short term residual signal:

r'(n)=e'(n)+b r'(n−M)

Finally, the set of ai coefficient is used to tune the short term residual filter (21) to synthesize the speech signal s(n) using:

$$s'(n) = r'(n) + \sum_{i=1}^{8} a_i \cdot s'(n - i)$$

Figure 6:
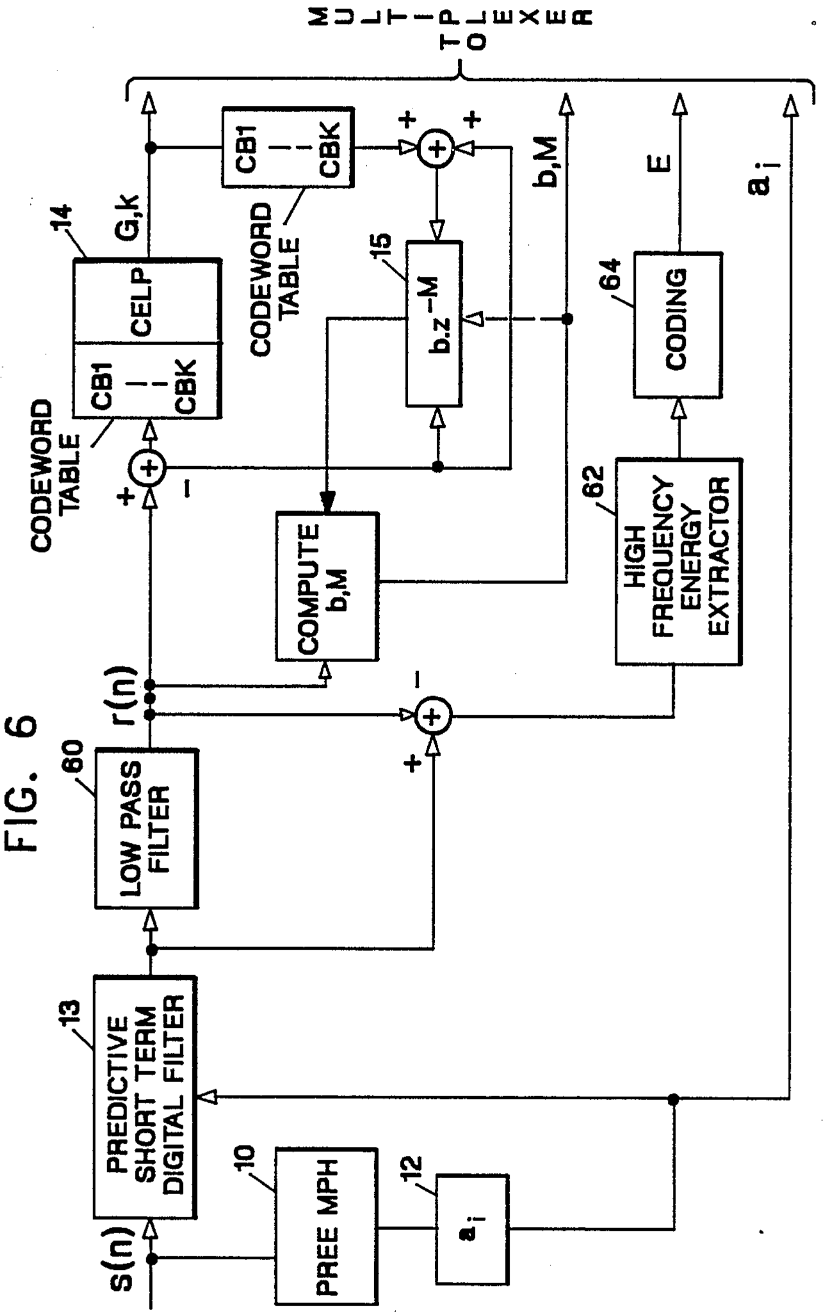
FIGS. 6 and 7 are devices for another implementation of the invention.

The low bit rate coding process of this invention enables additional savings when applied to Voice Excited Predictive Coding (VEPC) as disclosed by C. Galand et al in the IBM Journal of Research and Development, Vol. 29, No. 2, March 1985 In this case, Code Excited Linear Predictive encoding would be performed over the base-band signal, band limited to 300–1000 Hz for example using a system as represented in FIG. 6.

In this case the signal r(n) is not anymore derived from a full (300–3400 Hz) band signal, but it is rather derived from a low band (300–1000 Hz) signal, provided by a low pass filter (60). The high bandwidth signal (1000–3400) obtained by simply subtracting the low bandwidth signal from the original signal, is processed in a device (62) to derive an information relative to the energy contained in said high frequency bandwidth. The high frequency energy is then coded into a set of coefficients E's (e.g. two E's) multiplexed toward the receiver/synthesizer. Otherwise, all remaining operations are achieved as disclosed above with reference to FIG. 3–5.

Figure 7:
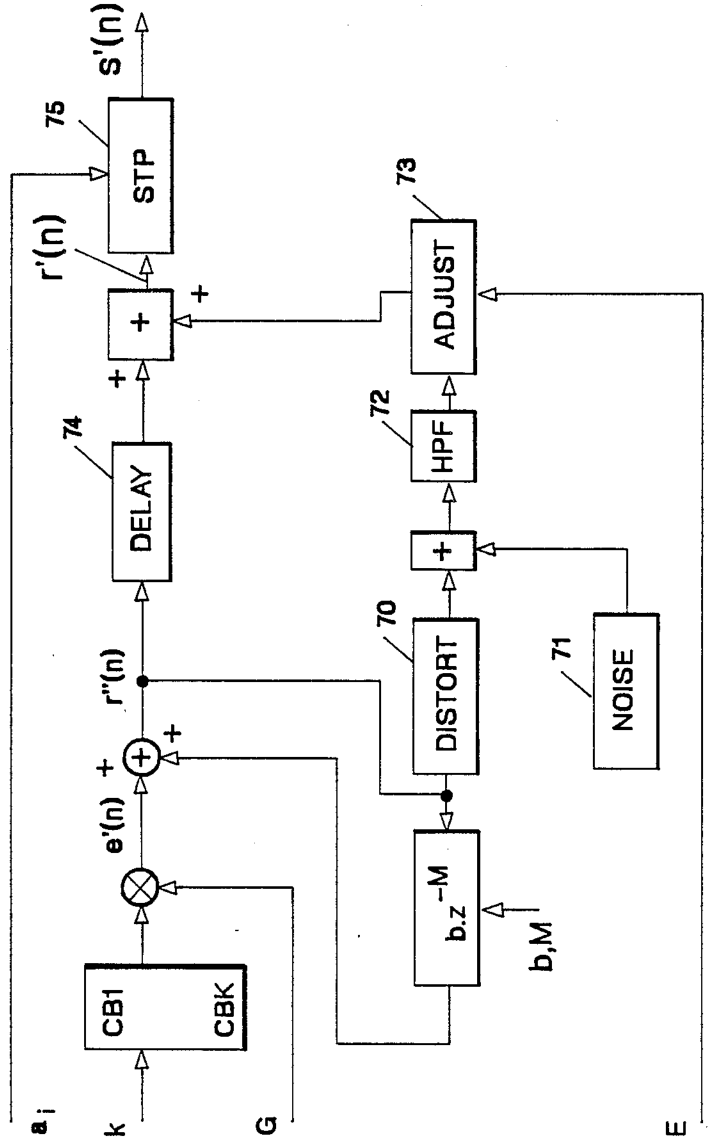

For synthesis operations (see FIG. 7) once a base band residual signal r''(n) is synthesized as disclosed with reference to FIGS. 1 and 2, the high frequency bandwidth components need be added. For that purpose, the base-band spectrum is spread by means of a non linear distortion (70) technique (full wave rectifying) which expands the harmonic structure due to the pitch periodicity up to 4 KHz. In case of unvoiced sounds and specially for the fricative sounds, the base-band spectrum may be too poor to generate accurately a high frequency signal. This is compensated for, by using a noise generator (71) at very low level, and adding both. The spread bandwidth is filtered in (72) to keep the (1000–3400) bandwidth, the energy contents of which is adjusted in (73) to match the original high frequency spectrum based on the E's coefficients received for the block of samples being processed. The high band residual thus obtained is added to the synthesized base-band residual delayed in (74) to take into consideration the delay provided by processing involving (70), (72) and (73) devices, and get the synthesized short term residual signal r'(n) which is then filtered into the short term prediction filter (75) providing the synthesized voice s'(n).

What is claimed is:

1. A process for low bit rate block encoding a sampled voice signal s(n) based on code-excited encoding providing at least one prestored table address k and associated gain coefficient G, for each block of samples to be encoded, said process including:

preemphasizing said s(n) signal into an sp(n) signal and deriving partial autocorrelation coefficients ai therefrom;

filtering the voice signal s(n) using a short-term predictive filter tuned by said ai coefficients and deriving therefrom a short-term residual r(n);

processing said r(n) to derive a gain factor "b" and a long-term delay M;

deriving a weighted and delayed synthesized short-term residual br'(n−M) from previously subtracting br'(n−M) from r(n) to derive a long-term residual signal e(n);

splitting e(n) into consecuive blocks; and, code excited encoding each block of said long-term residual e(n) into at least one TABLE address reference k and one gain coefficient G.

2. A low bit rate block encoding system for encoding a sampled voice originated signal s(n) into a d(n) data flow including for each block of samples a prestored TABLE address k and a gain coefficient G, said system including:

means for preemphasizing said s(n) signal; partial correlation means for deriving partial autocorrelation (PARCOR) coefficients $k_i$ from said preemphasized s(n), and deriving PARCOR related coefficients $a_i$ from said preemphasized s(n) signal;

short-term predictive filter means tuned with said $a_i$ coefficients and fed with s(n) to derive a short term residuals signal r(n) therefrom;

means for splitting r(n) into consecutive blocks of samples;

computing means connected to receive r(n) and derive a pitch related long-term delay parameter M and a gain factor b;

first adding means having a(+) input fed with said r(n) signal and a(−) input, and providing a long term residual signal e(n);

means for splitting e(n) into blocks of predetermined length;

code excited encoding means for converting each block of samples e(n) into a TABLE reference (k) and a gain coefficient (G), said reference representing the TABLE address of the codeword best matching the considered e(n) block multiplied by gain g;

a second adding means having a first (+) input fed with said selected codeword multiplied by gain G, and a second (+) input, said second adding means providing a synthesized short term residual r'(n);

delay means having an input fed with said synthesized residual r'(n) and for deriving a delayed synthesized residual r'(n−M);

multiplying means for multiplying sand delayed synthesized residual r'(n−M) by said gain factor b and derive b·r'(n−M) therefrom;

means for feeding said b·r'(n−M) into said first adder (−) input and said second adder (+) input; and, multiplexing means for multiplexing for each block of r(n) samples said gain coefficient G, table address K, gain factor b, long-term delay M and PARCOR coefficient $a_i$.

3. A low bit rate encoding system according to claim 2 wherein said TABLE is made to store a normalized initial set of e(n) samples into a sequence ($Y^k$) with n−1,2, . . . , L wherein L is an integer number n defining a codeword length, and k=1,2, . . . , K, with K being the total number of codewords stored into said table.

4. A low bit rate encoding system according to claim 3 wherein said Code-Excited encoding means include:

means for setting a predefined (1) samples long window;

means for shifting said window over said TABLE, from a sample position to the next;

autocorrelation means sensitive to said window shifting means for deriving Ek correlation terms:

$$Ek = \underset{n=1}{\overset{L}{\mathrm{SIGMA}}}\, e(n) \cdot Y(n + k - 1) \text{ for } k = 1,2, \ldots K,$$

wherein SIGMA symbolizes a summing operation;

selecting means sensitive to said Ek terms for detecting the maximum Ek term, whereby said gain coefficient G is set equal to Ek and k is selected for being the table reference for the processed block of samples.

5. A low bit rate encoding system according to claim 2 or 3 or 4 wherein said $a_i$ computing means include:

first computing means for computing $$R1 = \underset{j=1}{\overset{j'}{\mathrm{SIGMA}}}\, s(j) \cdot s(j)$$

wherein j, is a predetermined integer value, e.g., : j'=160;

second computing means for computing $$R2 = \underset{j=1}{\overset{j'}{\mathrm{SIGMA}}}\, s(j - 1) \cdot s(j)$$

means for converting said s(n) signal into sp(n)=S(N)−(R2/R1)·s(n−1), said sp(n) being then used to derive said ai coefficients set therefrom.

6. A low bit rate encoding system according to claim 2 or 3 or 4 wherein said system further includes:

low pass filtering means connected to said short term predictive filter and providing a low frequency bandwidth signal r(n) to be Code-ExCited coded into (G, k)'s; and means for coding the energy of the removed high frequency bandwidth and for feeding said coded energy into said multiplexing means.

* * * * *